US009099007B1

(12) United States Patent
Abumov

(10) Patent No.: US 9,099,007 B1
(45) Date of Patent: Aug. 4, 2015

(54) COMPUTERIZED PROCESSING OF PICTORIAL RESPONSES IN EVALUATIONS

(75) Inventor: Pavel Abumov, Santa Cruz, CA (US)

(73) Assignee: Quaest, Inc., Dallas, TX (US)

( * ) Notice: Subject to any disclaimer, the term of this patent is extended or adjusted under 35 U.S.C. 154(b) by 447 days.

(21) Appl. No.: 13/470,980

(22) Filed: May 14, 2012

Related U.S. Application Data

(60) Provisional application No. 61/486,309, filed on May 15, 2011.

(51) Int. Cl.
*G06K 9/00* (2006.01)
*G09B 7/00* (2006.01)
*G06F 17/21* (2006.01)
*G06F 3/0488* (2013.01)

(52) U.S. Cl.
CPC .............. *G09B 7/00* (2013.01); *G06F 3/04883* (2013.01); *G06F 17/21* (2013.01)

(58) Field of Classification Search
CPC ... G06F 17/24; G06F 17/215; G06F 3/04883; G06F 3/0345; G06F 17/21; G06F 2003/04808; G06F 9/4443
USPC ............................ 382/186–189; 345/173–183
See application file for complete search history.

(56) References Cited

U.S. PATENT DOCUMENTS

| 5,011,413 | A | 4/1991 | Ferris |
| 5,085,587 | A | 2/1992 | Desforges |
| 5,211,564 | A | 5/1993 | Martinez |
| 5,583,543 | A * | 12/1996 | Takahashi et al. ............ 345/173 |
| 5,672,060 | A * | 9/1997 | Poor ............................. 434/322 |
| 6,173,154 | B1 | 1/2001 | Kucinski |
| 6,493,536 | B1 | 12/2002 | Jongsma |
| 6,535,204 | B2 * | 3/2003 | Sun .............................. 345/173 |
| 6,731,803 | B1 * | 5/2004 | Aharonson et al. ........... 382/187 |
| 6,988,895 | B1 | 1/2006 | Lamarche |
| 7,054,464 | B2 | 5/2006 | Poor |
| 7,077,313 | B2 | 7/2006 | Chung |
| 7,146,128 | B2 | 12/2006 | Okubo |
| 7,249,950 | B2 * | 7/2007 | Freeman et al. .............. 434/155 |
| 7,298,901 | B2 | 11/2007 | Mcintosh |
| 7,298,902 | B2 | 11/2007 | Cichielo |
| 7,533,354 | B2 | 5/2009 | Sharp |
| 7,555,145 | B2 * | 6/2009 | Holenstein et al. ........... 382/113 |
| 7,614,553 | B2 | 11/2009 | Chung |
| 7,988,047 | B2 * | 8/2011 | Chung et al. .................. 235/386 |
| 8,257,086 | B1 * | 9/2012 | Di Carlo ....................... 434/162 |
| 2002/0197589 | A1 * | 12/2002 | Wood et al. ................... 434/201 |
| 2004/0064787 | A1 * | 4/2004 | Braun et al. .................. 715/505 |
| 2005/0106538 | A1 * | 5/2005 | Freeman et al. .............. 434/167 |

(Continued)

*Primary Examiner* — Aaron W Carter
(74) *Attorney, Agent, or Firm* — Pierson IP, PLLC

(57) ABSTRACT

A system and methods for computerized processing of evaluations containing responses in a pictorial from are disclosed. The system is suitable for interpreting and displaying contextualized responses in evaluations, such as knowledge assessments and surveys. The system includes a collection terminal for obtaining evaluation response data and a processing terminal with memory storing an evaluation template containing processing rules. The processing method locates areas of interest containing pictorial responses and carries out analysis of each area, which includes locating the area within the obtained data, identifying type of the response within the area, and determining value of a response within the area by applying a processing method corresponding to the type of the response. Then the response is recorded in a database and is available for display in a context of an evaluation.

20 Claims, 10 Drawing Sheets

(56) References Cited

U.S. PATENT DOCUMENTS

2006/0286539 A1* 12/2006 Tidwell-Scheuring et al. .............................. 434/353
2009/0304281 A1* 12/2009 Yipu .............................. 382/187
2010/0075291 A1* 3/2010 DeYoung et al. ............. 434/350
2010/0075292 A1* 3/2010 DeYoung et al. ............. 434/350

* cited by examiner

Indicate Queensland with hatching and Tasmania with solid filling: 610

Shade out the largest triangle below:

620

Draw filled triangle of area 0.5unit²: 630

Fill in ¼ of the circle
(from the line going clockwise):

640

COMPUTERIZED PROCESSING OF PICTORIAL RESPONSES IN EVALUATIONS

This application claims a benefit of priority under 35 U.S.C. §119 to Provisional Application No. 61/486,309 filed on May 5, 2011, which is fully incorporated herein by reference in its entirety.

BACKGROUND OF THE INVENTION

1. Field of the Invention

The disclosed embodiments relate to the general field of document processing with data capturing devices. More particularly, the disclosed embodiments relate to a processing system for evaluations containing responses in a pictorial form well suited for use in data collection, and methods of processing thereof.

2. Description of Related Art

Efficiency and effectiveness of data collection are both important to evaluation practitioners. While methods of capturing quantitative data directly in digital electronic forms are available, much data collection still involves paper documents as a familiar media providing necessary affordability, simplicity and unconstrained response format. Paper-based evaluations are routinely used in education for knowledge assessments, in business environments for customer surveys, and in government institutions for personal data acquisition. One challenge associated with these evaluations generally arises from a number of conflicting data collection goals, including the desirability of administering a holistic evaluation containing open-ended responses while maintaining high data collection efficiency.

Over the last several decades, the efficiency aspect of data collection has seen multiple improvements. These gains in efficiency have often sacrificed the effectiveness of acquired data, for example, by reducing the process of answering an evaluation question to selecting among several clearly indicated pre-compiled answer options. However, there has been relatively little success in creating more effective paper-based and other data collection methods requiring little human intervention. A crowded field of paper-based evaluation processing has not been able to produce a viable solution to this long felt need among evaluation practitioners. Presently, unconstrained or open-ended responses typically require discretionary assessment, that is a time-consuming approach prone to human error, and so they are often avoided despite their multiple benefits. As a result, many standardized evaluations are being designed to adhere to the available simplistic response formats, which may have a profound effect on overall evaluation effectiveness. This is especially true in education where assessment influences the form of instruction, where open-ended responses showing the thought process of a student are used for diagnosis of student misconceptions, and where the younger population prefers highly intuitive and engaging question formats.

Therefore, it would be beneficial to provide a system that processes evaluations containing responses in a substantially unconstrained pictorial form, yet still provides the data collection efficiency that evaluation practitioners desire. It would also be beneficial to provide methods for processing a broad variety of such pictorial responses that significantly reduce the amount of human effort presently required for such processing.

SUMMARY OF THE DESCRIBED EMBODIMENTS

It is to be understood that the terminology used in the description is for the purpose of describing the particular embodiments only, and is not intended to limit the scope of the present invention which will be limited only by the appended claims. Further, all technical terms used herein have the same meanings as commonly understood by one of ordinary skill in the art, unless defined otherwise This paper describes various embodiments that relate to methods and systems for processing evaluation data that enable automated processing of substantially unconstrained responses in a pictorial form resulting in automated collection of high quality data while reducing necessary human intervention.

According to one embodiment, a computerized system for processing of evaluations containing responses in a pictorial form is disclosed. The system comprises a collection terminal for obtaining in a digital form evaluation response data provided by a plurality of evaluation respondents. The collection terminal may include a document scanner, an electronic imaging device, an interactive whiteboard, an electronic screen, a touch screen, a drawing pad, a network adapter, a disk controller, or a signal receiver; parts of the collection terminal may be geographically distributed. The system further comprises a processing terminal including a non-volatile memory configured for storing an evaluation template used for analyzing pictorial responses in the obtained data. The evaluation template is used to analyze the areas of interest and describes location of areas of interest within the obtained data. The analysis of each area of interest includes locating the area within the obtained data, identifying type of the response within the area of interest, and determining value of the response by applying a processing method corresponding to the type of the response. The processing method may comprise correcting thereof and interpreting the response by at least one trained editor. In an embodiment, the processing method includes associating the response with a set of predefined image patterns, analyzing a representation of each of the image patterns in the response, associating a value with each representation, and determining value of the response based on the values associated with the representations of the image patterns. The processing method can be applied to update the evaluation template data. In an embodiment, the processed response is recorded in a database and is subsequently viewed on a display terminal in context of the evaluation using a display template. The system may deploy a plurality of geographically distributed computing systems that are capable of transferring data using standard data transfer protocols.

A computer-implemented method for processing of evaluations containing pictorial responses is disclosed. The processing involves the following operations: obtaining evaluation response data in a suitable digital form, identifying a pictorial response within the obtained data, determining a type of the response and a value of the response by using a set of processing rules specified in an evaluation template, and recording value of the response to computer-readable media. The method may additionally include using discretion of a trained editor to interpret the response, as well as subsequent displaying of the pictorial response within its evaluation context. The operation of obtaining responses may require such devices as a document scanner, an electronic imaging device, an interactive whiteboard, an electronic screen, a touch screen, a drawing pad, a network adapter, a disk controller, or a signal receiver; the devices may be geographically distributed. In an embodiment, the processing method includes associating the response with a set of image patterns specified in the evaluation template, analyzing a representation of each of the image patterns in the response, associating a value with each representation, and determining value of the response based on the values associated with the representations of the image patterns. The method optionally deploys a plurality of geographically distributed computing systems that are capable of transferring data using standard data transfer protocols.

The features that characterize the invention, both as to organization and method of operation, together with further aspects and advantages thereof, will be better understood from the following detailed description used in conjunction with the accompanying drawings which illustrate, by way of example, the principles of the invention.

BRIEF DESCRIPTION OF THE DRAWINGS

The invention will be readily understood by considering the following detailed description in conjunction with the accompanying drawings in which:

FIGS. 6-9 are a series of panels showing exemplary pictorial responses to evaluation questions. In the panels, thick solid lines, solid filling and bold font are used to illustrate marking corresponding to a provided response and thin lines and printed text are used to illustrate evaluation question formulation.

DETAILED DESCRIPTION OF SELECTED EMBODIMENTS

Figure 1:
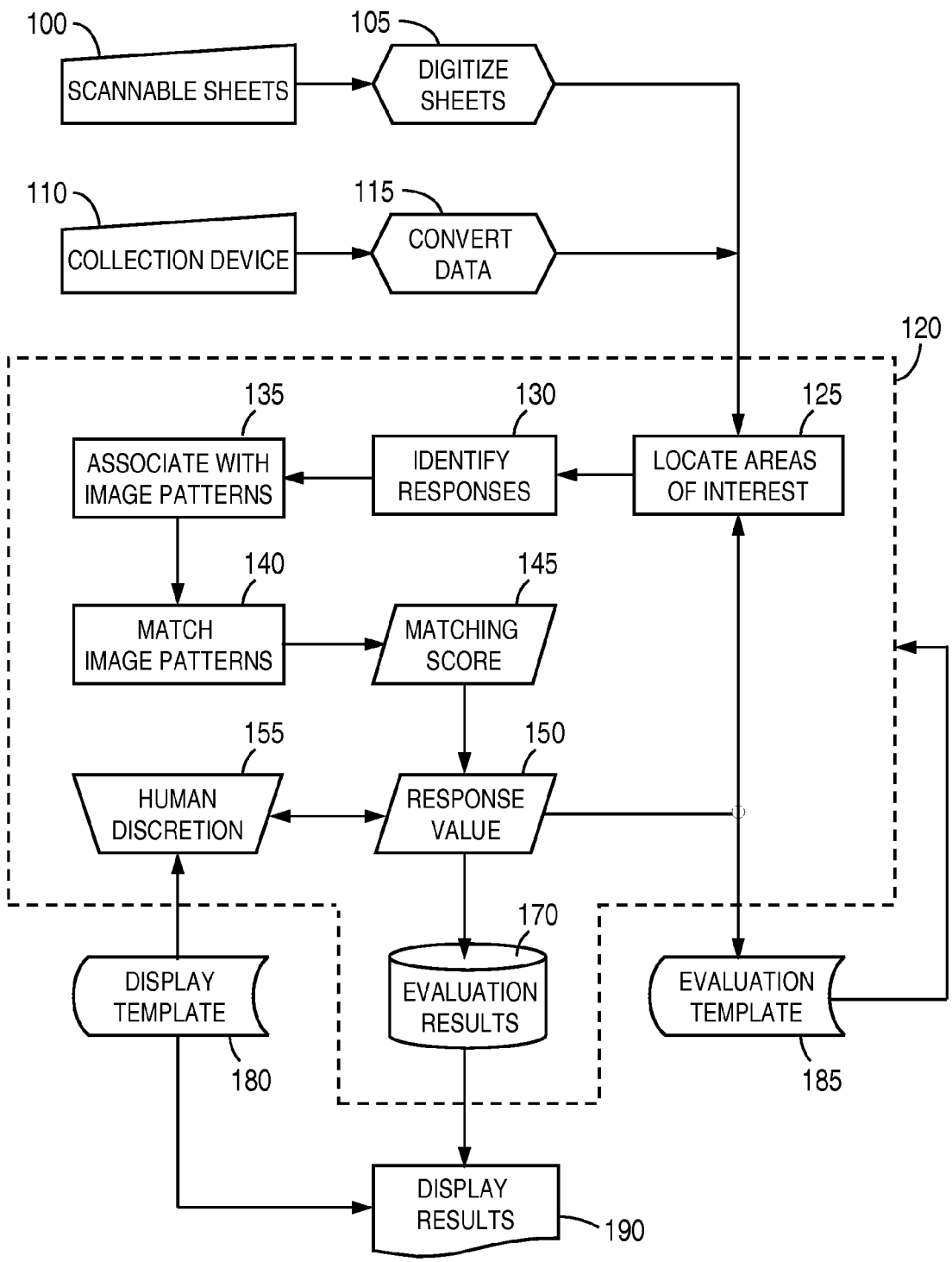
FIG. 1 is a flow chart for processing an evaluation using an embodiment of the present invention.

Reference will now be made in detail to representative embodiments illustrated in the accompanying drawings. It should be understood that the intention is not to limit the embodiments to one preferred embodiment. On the contrary, the intention is to cover modifications, equivalents and alternatives falling within the spirit and scope of the described embodiments as defined by the appended claims.

The embodiments herein relate to a system and methods for automated collection of data from evaluations containing responses in a pictorial form that are both efficient and effective. In one embodiment, the system can include an optical imaging device for obtaining digital images of evaluation response sheets. Areas of interest corresponding to pictorial responses are located within the obtained digital images, using information stored in an evaluation template. Provided pictorial responses within the located areas of interest are analyzed using image patterns described in the evaluation template and typically a response value is produced. In an alternative embodiment, pictorial responses are provided in a digital form through such data collection terminals as, interactive whiteboards, electronic screens, touch screens devices, drawing pads, network adapters, disk controllers, signal receivers and the like. The method and the system of processing evaluations containing pictorial responses may be referred to herein simply as a processing method and a processing system, correspondingly.

In this context the term "area" generally covers at least one part of presentation of an evaluation viewed by a respondent, with no limitations on the presentation media. Thus, an area can represent a part of scannable sheet or its digital representation, or a part of an electronic page. Accordingly, a blank area is an area without indication of a response, and a marked area is an area bearing an indication of a response. In addition, an area may include formulation of an evaluation question and may consist of separate parts, for example, when an area contains an evaluation question starting on one response sheet and ending on another response sheet. Areas may partially or completely overlap.

The term "response" used herein describes data provided by a respondent in an evaluation in accordance with provided instructions. The provided data includes respondent identification information, evaluation presentation identification information, and data provided on behalf of the respondent. A response containing indicia constructed by a respondent using a writing, drawing, painting, swiping or pointing tool, such as a pen, a pencil, a crayon, a light pen, a stylus, a finger, a computer mouse, a touchpad, a trackball, etc., and that can be described with an image is referred to as "pictorial response" herein. For simplicity, the constructed indicia are referred to as marking. For brevity, set of rules describing processing of image patterns related to marking corresponding to a pictorial response will also be referred to as type of response.

As used in this context, an "evaluation template" is at least one data structure containing information describing at least location of areas of interest within evaluation data, wherein the evaluation data includes at least a representation of respondent marking. An evaluation may consist of multiple parts and may be presented in different versions and formats. For brevity, set of rules describing processing of image patterns related to marking corresponding to a pictorial response will also be referred to as type of response. The term "display template" refers to at least one data structure that contains information describing rules for one or more modes of presentation of processed response data, wherein the rules include at least arrangement of the response data during display.

Since there is no restriction on the particular appearance of pictorial responses, the processing method is applicable to a broad variety of pictorial responses, thus realizing significant savings in human resources and high consistency of response data analysis. It is contemplated that the processing method can enable automated processing of open-ended questions heretofore deemed unsuitable for use in standardized evaluations.

FIG. 1 is a flow chart for processing an evaluation using an embodiment of the present invention. Pictorial responses are provided on scannable sheets during step 100 that are subsequently converted to digital images in step 105, wherein the conversion may include cropping, deskewing, scaling and rotation operations and the images relate to bitmap, vector, metafile and other graphic types. The scannable sheets may bear special marking for the purpose of image and/or area alignment and/or identification, such as alignment marks, barcodes, and QR codes. The special marking can be pre-printed or provided by evaluation respondents. Alternatively, pictorial responses may be obtained in a digital form in step 110 and the obtained digital data is optionally converted to a suitable format, for example, bitmapped or vectorized form, in step 115.

Then areas of interest containing pictorial responses within the resulting digital data are analyzed and recorded using process 120. The rules for implementing steps in process 120 are specified in an evaluation template 185. The analysis takes into consideration pictorial characteristics of whole and parts of the pictorial responses, including but not limited to their combination, mutual arrangement, shape, size, location, angle, color, stroke, texture, input tool used or a combination thereof. The analysis is accomplished by locating the areas of interest in step 125, identifying one or more pictorial responses within each area of interest in step 130, and for each pictorial response: associating the response with a set of predefined image patterns in step 135, analyzing the match between the image patterns and their representation within the response in step 140, associating matching score with each of the representations in step 145, and producing a value of the response based on the matching score values in step 150. The image patterns may overlap, partially or completely. Evaluation template 185 contains particular rules for assigning matching score based on image matching results and for assigning response value based on matching score values.

Producing the value of the response optionally involves discretion of a trained editor (e.g. a human editor or an artificial intelligence system) in step 155 for quality control purposes or for processing responses of certain types, such as handwriting and complex drawings. Typically, editor discretion is required for annotation of responses that were assigned a low level of confidence during step of pattern matching 135. Accordingly, response value 150 is a data structure comprising annotation such as response score, evaluator comments, and other relevant information, such as clipped image of the response, etc. Step 155 may compliment or replace steps 135-145 and may be accomplished after step 170 as well. The rules for presentation of response data during step 155 are specified in display template 180.

In an embodiment, editing step 155 is iterative whereby either the processing algorithm or the operator have a choice to adjust processing parameters and initiate steps 130-150 to compute response value 150 with the new parameter values. In another embodiment, steps 130-145 are skipped and response value 150 is obtained as a statistical measure of input supplied by one or more operators in step 155, for example, mean supplied score, longest supplied comment, etc. Details of operator involvement and iterative processing may vary by question and are specified in evaluation template 185. The data describing obtained response values in step 150 is then appended to evaluation results in step 170. The contents and structure of the appended data are specified in evaluation template 185. Evaluation results 170 are a data structure that can be accessed later for reporting purposes in step 190 or for subsequent processing. The rules for presentation of processed responses in step 190 are described in display template 180. In an alternative embodiment, steps 135-145 are either replaced with step 155 or omitted, whereby the main function of the processing system is collecting, storing and displaying evaluation response data.

In some embodiments, obtained digital representation of a pictorial response is included in recorded evaluation results 170, which allows for displaying the response record within evaluation context, or contextualized response display, during step 190 or step 155. The context may include presentation of other responses to the corresponding evaluation question or appearance of the response on at least a portion of a blank or marked area. In other embodiments, the process illustrated in steps 135-155 of FIG. 1 is used to update the evaluation template data, for example, when provided response data represents an answer key to knowledge assessment questions and is used to define type and spatial arrangement of response image patterns associated with the question.

Two responses are considered to be of different type herein if analysis of a set of image patterns associated with each response uses substantially different image processing methods during steps 130-145 for the two responses. Thus, all responses requiring clipping and/or scaling of an image of a filled area are considered of same type (including responses whose analysis skips steps 130-145) unless their analysis during steps 130-145 discriminates between the natures of present marking inside clipped areas by their pictorial characteristics. Likewise, responses requiring indication of one filled dot and several filled dots, wherein formulation of corresponding questions does not instruct different dots to have distinctly different characteristics, such as shape, color, filling, etc., are of same type. Likewise, a response consisting of only checkmarks and a response consisting of only filled dots are of same type if used analysis methods do not discriminate image patterns by shape of marking (e.g. determine whether a filled dot or a checkmark was indicated) and only determine a presence of marking in an area of interest. Likewise, responses consisting entirely of a written phrase or entirely of a written number, even where the phrase and the number are different, are of same type, unless substantially different image processing methods are used to process the two responses. For example, an evaluation consisting of nine questions has only three types of responses if an evaluation template specifies: (i) processing of five questions as clipping, rescaling and displaying images of corresponding marked areas to trained editors for interpretation; (ii) processing of the other two questions as clipping and using optical character recognition to interpret marking inside the corresponding clipped areas; and (iii) processing of still other two questions as analyzing several regions inside each of the corresponding marked areas to detect presence of marking wherein the marking is not discriminated by such pictorial characteristics as shape or color.

Evaluation template 185 contains rules for executing process 120, such as input parameters and optional custom instructions. The rules specify execution of such operations as calculation of matching confidence levels for image patterns, calculation of matching score based on confidence levels, calculation of response value based on matching score, deployment of editor discretion and iterative processing, identification of corrections within a response, scheduling of response data processing, etc.

Figure 2:
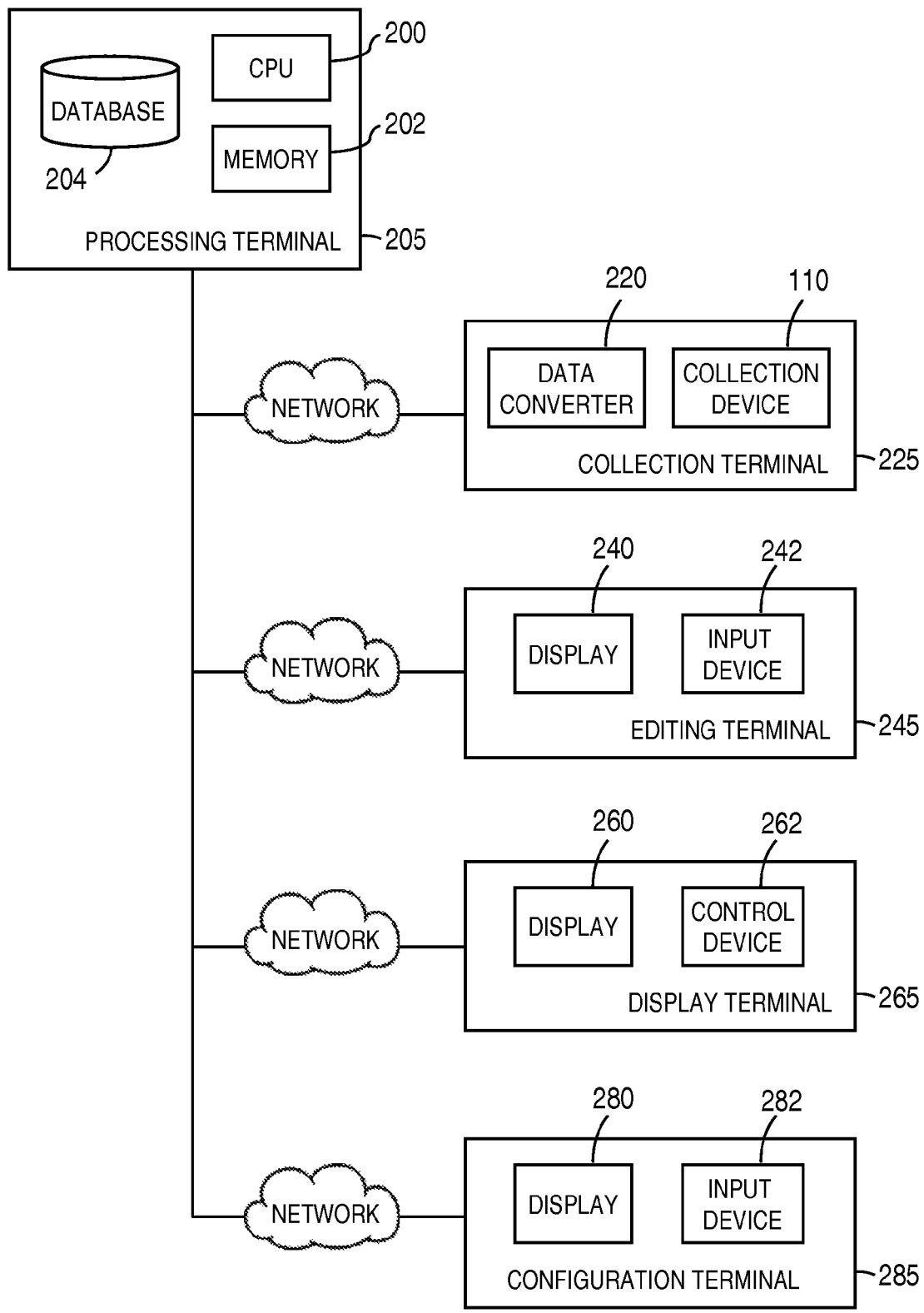
FIG. 2 is an illustration of hardware configuration of an embodiment o the present invention.

Referring now to FIG. 2, hardware configuration of one embodiment is schematically illustrated. The hardware configuration includes collection terminal 225, editing terminal 245, and display terminal 265 that are electronically coupled to processing terminal 205 using a network or other type of connection that is capable of transferring data using USB, SATA, Firewire, HTTP, HTTPS, FTP, SFTP, SSH, UDP or other common data transfer protocols.

Collection terminal 225 includes a collection device 110, such as an interactive whiteboard, an electronic screen, a touch screen, a drawing pad, a document scanner, an imaging device, a network adapter, a disk controller, a signal receiver, etc., and an optional data converter 220. Collection terminal 225 is configured to obtain evaluation data in a digital form by using collection device 110 and optionally converting it to a different format, wherein conversion step 115 is performed using and/or processing device 200. For responses provided on scannable sheets, collection device 110 typically is an electronic imaging device deriving from a document scanner or a digital camera. Thereby terminal 225 is used to convert the scannable sheets to digital format during step 105. In an embodiment, the imaging device is automated for batch imaging, and optionally includes an embedded system for processing of captured data. For responses provided directly in digital form, collection device 110 typically is an interactive whiteboard, an electronic screen, or a touch screen. In some embodiments, collection device 110 and data converter 220 are parts of the same apparatus, such as a touch screen computer or a digital camera.

Processing terminal 205 is configured to receive the obtained digital data from collection terminal 225 and to execute process 120. Processing terminal 205 typically comprises one or more databases 204 and computer-readable media 202 (a hard drive, ROM, RAM, flash memory or other types of non-volatile memory), that are operatively coupled to a processing device 200. In an embodiment, processing device 200 includes a multiprocessor system or a distributed computing system. Storage media 202 and/or database 204 are used to store an evaluation template 185, a display template 180, evaluation results 170 and computer-executable instructions used to execute process 120. Processing device 200 is used to perform data manipulation required throughout process 120.

Editing terminal 245 comprises an electronic display 240 for viewing input from processing terminal 205 and a user input device 242 for providing data to processing terminal 245. In some embodiments, display 240 and input device 242 are parts of the same apparatus, such as a touch screen device. Thus, trained editors can review a pictorial question using display 240 and update the response value or provide other relevant data using input device 242 during step 155. In an alternative embodiment, editing terminal comprises a processing device configured for deploying computer-executable instructions designed for processing certain kinds of responses (e.g. artificial intelligence systems for automatic scoring of essays).

In an embodiment, the hardware configuration includes configuration terminal 285 electronically coupled to processing terminal 205 and comprising an electronic display 280 and a user input device 282. Configuration terminal 285 is utilized for updating computer-executable instructions used to execute process 120, information stored in database 204, and evaluation template information 185. For example, configuration terminal 285 can be used for creating and/or editing an evaluation template 185. In an embodiment, configuration terminal 285 is used for automated creation of multiple versions of evaluation template 185, such as versions with scrambled order of question order and/or answer options order, wherein the creation can be made dynamically while administering the evaluation.

Display terminal 265 is configured for displaying evaluation results 170 during step 190 and includes an electronic display 260 and a control device, typically a keyboard or a mouse, to adjust presentation of displayed evaluation results 170.

In some embodiments, two or more of the terminals (referring to collection terminal 225, editing terminal 245, display terminal 265, configuration terminal 285, and processing terminal 205) share the same hardware. For example, processing terminal 205 may include a computer that is also used to perform functions of editing terminal 245 and display terminal 265. In an embodiment, one or more of the terminals include a plurality of geographically distributed units, wherein each unit satisfies description of the corresponding type of terminal.

In an embodiment, evaluation template 185 specifies conditions and mode for execution of process 120. For example, results notification delivery to respondents can be scheduled for 1 hour after all evaluation results 170 were obtained. Switching to another trained editor can be made in the event that a particular trained editor is performing poorly (e.g. is too slow to review response data) during step 155. Automatic backup of database 204 can be performed after certain amount of responses has been processed. Step 155 can be skipped as unnecessary if steps 130-145 produce high confidence levels for most response values 150. Priority of processing 120 of an evaluation can be determined in a job queue of all processing requests submitted to processing terminal 205.

The following description relates to a method of processing pictorial responses, such as hand-drawn open-ended responses on scannable sheets or digitally drawn responses on electronic screens and devices with interactive surfaces. The processing method not only allows for both efficient and effective data collection, but also enables contextualized response interpretation and display, as will be described in more detail below. The processing method reduces constraints on the permitted forms of responses typically faced when designing evaluations for automated processing. Therefore, the quality of collected evaluation data depends greatly on the processing method.

These and other embodiments of the invention are discussed below with reference to FIGS. 3-9. However, those skilled in the art will readily appreciate that the detailed description given herein with respect to these figures is for explanatory purposes as the invention extends beyond these limited embodiments.

Generally, implementing step 140 may involve decomposing the respondent marking into a set of convenient basis components, such as pixels, pluralities of pixels, wavelets or vectors, and analyzing the component set with known mathematical or numerical algorithms. In an embodiment, analyzing the match involves additional image recognition parameters, e.g. levels of precision and sensitivity, color threshold levels, levels of noise reduction, contrast levels and so on, that are stored in evaluation template 185. The image recognition parameters may be adjusted during the time of processing of the evaluation, for example, to ensure that sensitivity levels are appropriate to the scanning quality of imaged response sheets.

In one embodiment, step 140 of matching image patterns with a provided pictorial response uses pixels as the basis components and is capable of discriminating pictorial objects by their size, location, shape and dimensions. The matching step can be implemented for a few exemplary basic image patterns as follows:

i. To determine whether a dot is placed at a given location, marked and non-marked pixels are counted in a predefined proximity (dot size) from the location to ensure that their respective ratio indicative of the marking density exceeds a threshold value and hence the dot is sufficiently filled. Additionally, marking density in a close proximity of the dot is calculated to ensure that the dot is isolated and is not part of another object. Satisfying these two conditions defines the dot as marked.

ii. To determine whether a straight dashed line has been drawn between two given locations, an imaginary rectangle is outlined with longer sides parallel to the line connecting the two locations and shorter sides passing near the two locations, the width of the rectangle being related to the sensitivity of line detection. Marking density is calculated within the rectangle to ensure the rectangle is sufficiently filled. Additionally, distribution of the marking density within the rectangle is calculated to ensure that it is sufficiently high in most of the rectangle and that it has multiple sufficiently periodic breaks. Additionally, marking density in a close proximity of the imaginary rectangle is calculated to ensure that the line is isolated and is not part of another object. Satisfying these three conditions defines the line as marked with a dashed stroke.

iii. To determine whether a region within certain bounds has been filled with a certain color, marking density is calculated within the region to ensure its sufficient filling. Additionally, distribution of the marking density is calculated to ensure that it is sufficiently high in most of the region. Additionally, number of all pixels with hue within certain tolerance from the expected hue value and number of all pixels are counted within the region to ensure that the distribution of their respective ratio is sufficiently uniform within the region and that its average exceeds a threshold value. Additionally, marking density of certain color in a close proximity of the region is calculated in a similar fashion to ensure that the colored region filling is isolated and is not part of another object. Satisfying these four conditions will indicate the region as marked with solid filling of a certain color.

iv. Performing image pattern matching for more complex objects is carried out by reduction to a combination of basic image patterns (dots, lines, and regions) shown in FIGS. 3A-3C. Examples of more complex objects include angles, paths, holes, symbols, and so on.

As described further below, additional methods can be used to discriminate between image patterns of same type by certain attributes (shape, stroke, color, etc.). Such methods enable distinction between such patterns as a filled round dot 300, an empty round dot 305, a triangular-shaped dot 310, and an arbitrarily shaped dot 315 represented in FIG. 3A; between thin line 330 and thick line 335 represented in FIG. 3B; and between solid fill 360 and hatching 365 of a region represented in FIG. 3C.

Figure 4A:
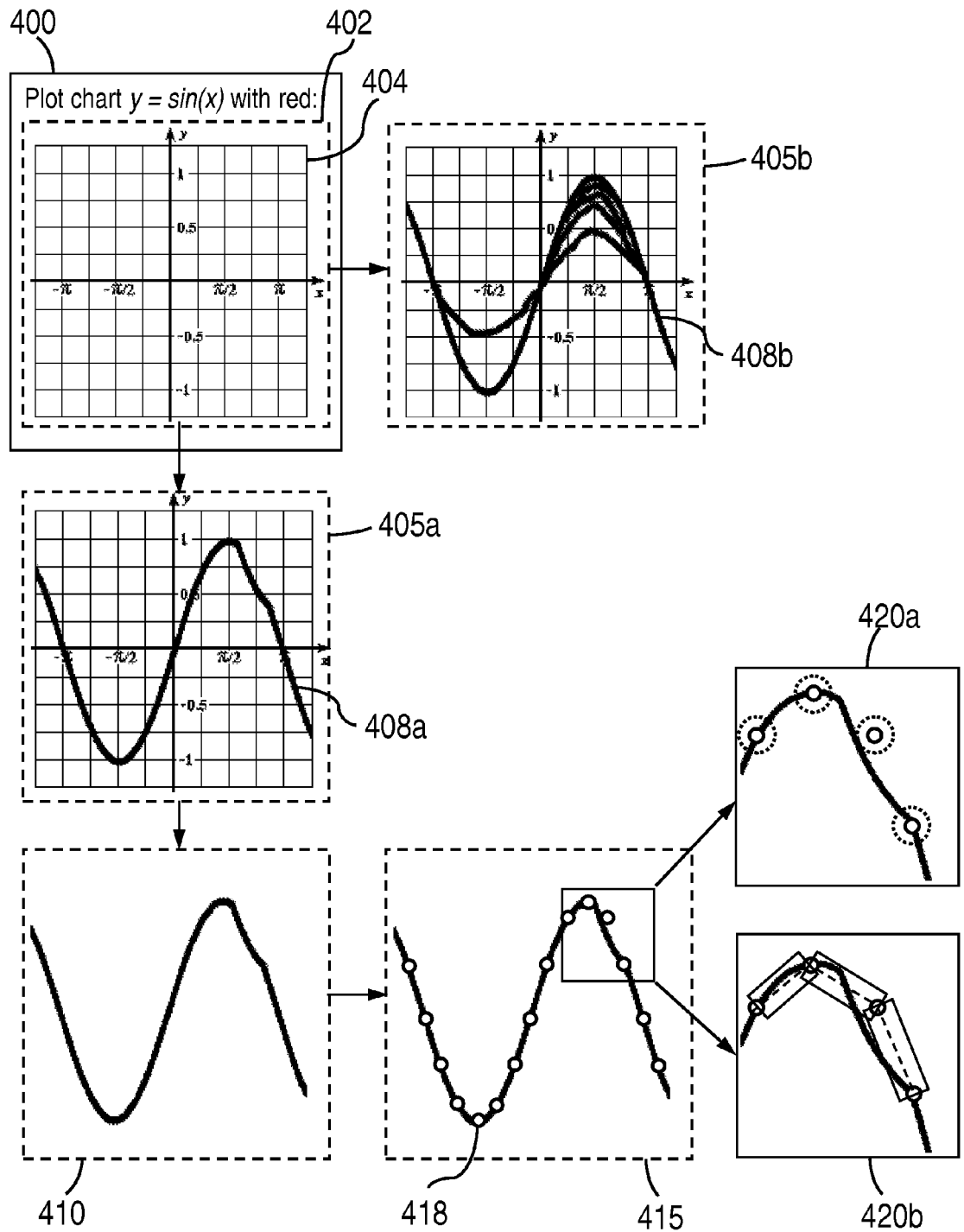
FIG. 4 shows processing of an exemplary pictorial response on a scanned sheet in form of (A) a curve; and (B)-(C) a region using an embodiment of the present invention
Figure 4B:
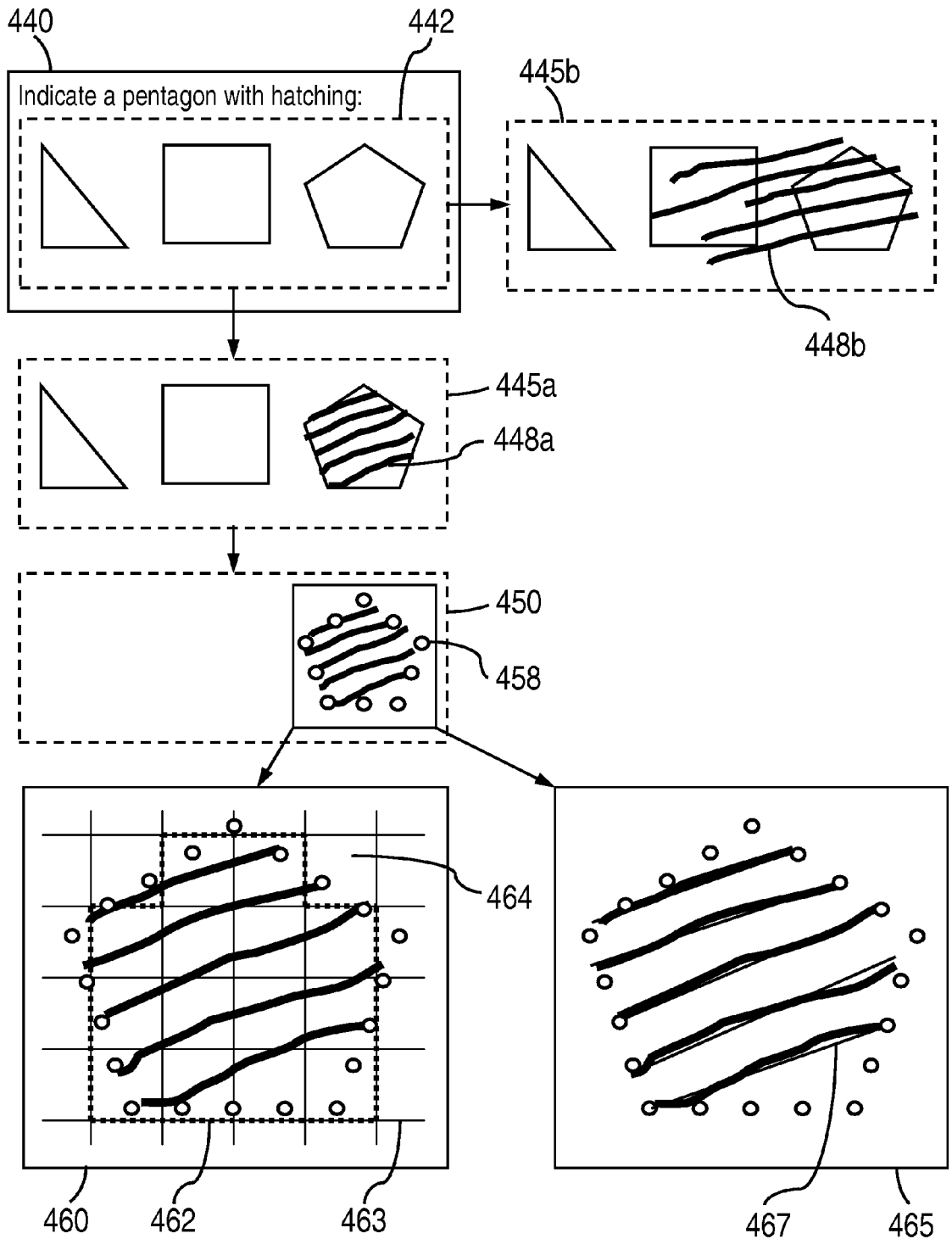
Figure 4C:
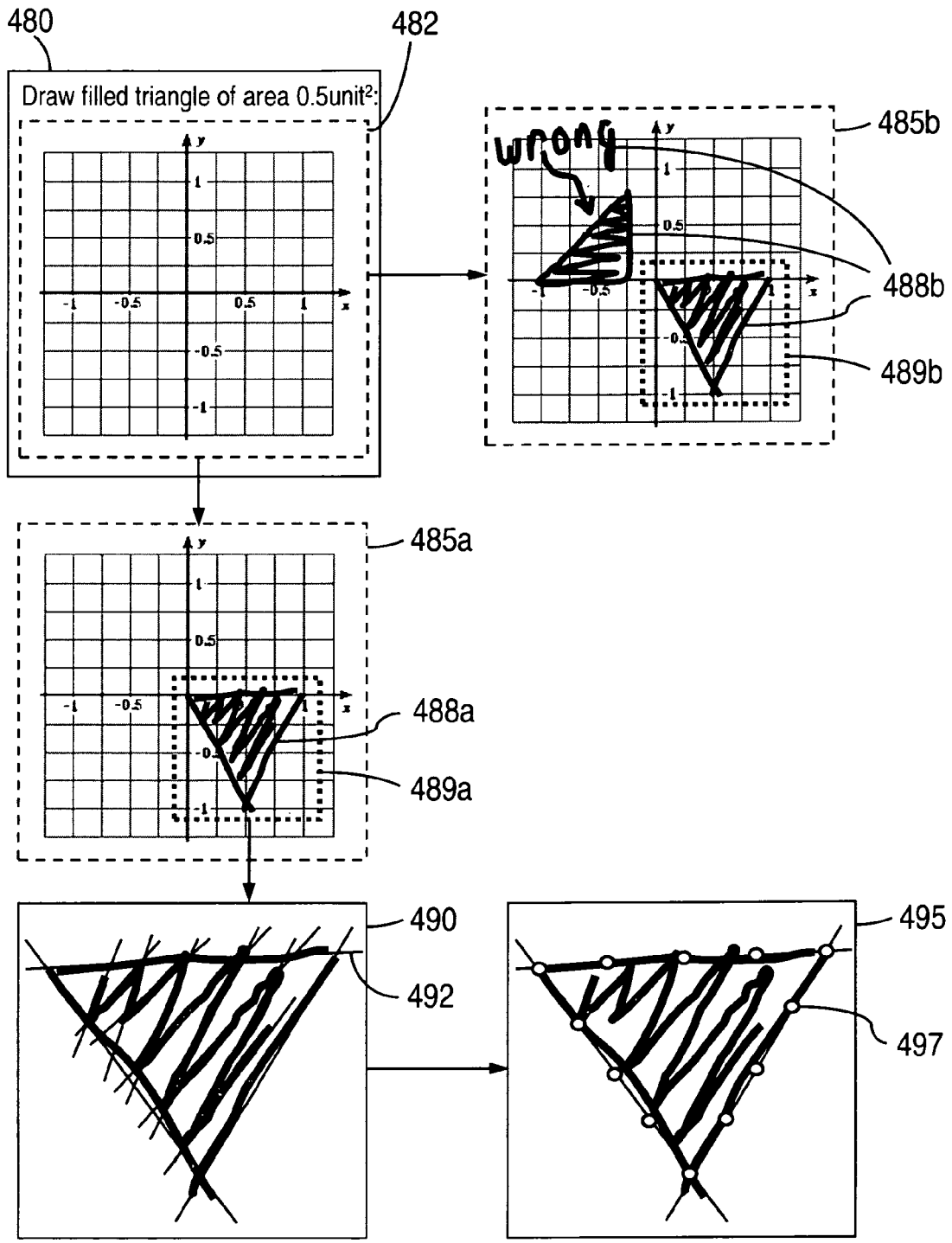

FIGS. 4A-4C show exemplary processing of pictorial responses on scanned sheets using an embodiment of the present invention. The exemplary processing corresponds to steps 130-150 of FIG. 1 to analyze a pictorial response.

Referring to FIG. 4A, an evaluation question 400 instructs a respondent to plot a curve of known shape and color in provided coordinate grid 404. In this particular example, a blank area of interest 402 specified in evaluation template 185 was chosen as shown in panel 400 and marked areas containing pictorial responses 405a and 405b are provided for analysis. With reference to marked area 405a, in order to identify provided response during step 130 respondent marking 408a is extracted from the provided marked area 405a using blank area data 402 and applying techniques of background subtraction, denoising, luminance histograms, and the like. Marking 408a may further be enhanced with edge detection, thinning, dilation, and other image processing algorithms. Additionally, panel 410 shows extracted respondent marking 408a that is analyzed for its predominant color during step 130 with methods such as pixel count and pixel color histograms. Assuming entire marking 408a conforms to an expected color value, a pictorial response has been identified as entire marking 408a. If required by question formulation, line thickness is determined through repetitively applying dilation by fixed amount and is based on a minimum dilation value for which most of sought marking disappears. Then marking 408a is associated with a set of corresponding image patterns, in this case a curve pattern specified in evaluation template 185, during step 135. By aligning area 405a with area 402 and using information about the curve pattern location within area 402 from evaluation template 185, expected location of the pattern curve within area 405a is determined. Thus the pattern curve 418 schematically shown by empty circles in panel 415 is associated with the respondent marking 408a.

Then the curve pattern is divided into imaginary segments whose ends are selected in the locations of empty circles shown in panel 415. These segments can be either described within the evaluation template 185 or generated dynamically with feature points extraction algorithms. There are at least three practical ways to perform matching step 140 to generate matching score 145. Matching of the entire respondent marking 408a can be carried out with known algorithms such as fast marching method, Fréchet distance calculation and so on. Alternatively, the matching can be done by approximation of the pattern curve a set of imaginary dot patterns (shown with dotted outlines in expanded view 420a) or a set of imaginary straight solid line patterns (shown with thin solid outlines in expanded view 420b) defined by locations at the ends of the imaginary segments. In the case of basic patterns chosen as dots, matching score could be calculated as a ratio of number of marked dots to number of all dots. This simple calculation yields matching score 145 equal 14/15=0.93, since respondent marking 408a passes through all dots shown in expanded view 420a except for one, leaving it non-marked. Likewise, matching score could be calculated for the case shown in expanded view 420b as a ratio of number of marked straight lines to number of all straight lines, yielding score 145 equal 13/14=0.93. Assuming a 10-point grading scale and no subsequent discretionary editing during step 155, the recorded response value 150 equals 9 points out of 10.

An additional verification is needed that the region defined by the pattern curve is the only region of the area bearing respondent marking, whereby a response provided in area 405b would be of less merit than a response provided in area 405a. This verification can be accomplished by checking that all dots placed in the intersections of the coordinate grid 404 in the vicinity of the pattern curve are non-marked. It is straightforward to expand this technique to templates without a grid, whereby an imaginary grid is used instead.

Lastly, the obtained response value 150 representing interpretation of the provided response is recorded to evaluation results 170. The result of the described processing corresponding to steps 130-150 is that pictorial responses are interpreted based on their pictorial representation on the response sheets and assigned response values. The recorded response value can subsequently be retrieved during step 190 for further processing or for viewing using a set of presentation rules specified in display template 180.

Referring to FIG. 4B, an evaluation question 440 instructs a respondent to indicate a certain object with hashing. A blank area of interest 442 is chosen and marked areas containing pictorial responses 445a and 445b are provided. The analysis is done similarly to the analysis of FIG. 4A in many ways. With reference to marked area 445a, respondent marking 448a is similarly extracted from the provided marked area 445a. Step 450 shows extracted respondent marking 448a that is similarly associated with a set of corresponding image patterns, in this case a pentagon pattern 458 (schematically depicted with empty circles), during step 135.

Panel 460 shows an imaginary grid 463 that divides space within the area into sufficiently small imaginary rectangles 464. Approximation 462 (illustrated with a dashed line) of the sought pentagon pattern 458 is constructed as a set of rectangles 464 significantly overlapping with the pentagon pattern 458, in accordance with evaluation template 185. Matching calculation 140 includes verification that the pentagon pattern is marked, that no adjacent space is marked, and that the marking conforms to hatching pattern. To ensure that the pentagon is marked, the number of rectangles 464 inside region 462 bearing significant marking is calculated. In this case, only one bottom-right rectangle is devoid of marking out of total 14 rectangles. The large fraction of marked rectangles equal 13/14=0.93 demonstrates high confidence meaning that marking is sufficiently distributed, hence, the pentagon pattern 458 is considered marked. Further, to ensure that no adjacent space is marked, all imaginary rectangles 464 that border region 462 are considered. The number of bordering rectangles 464 bearing significant marking is then calculated. In this case, all bordering rectangles but one top-left rectangle are significantly devoid of marking. The large fraction of non-marked rectangles equal 19/20=0.95 demonstrates high confidence meaning that pentagon pattern marking is sufficiently isolated from other marking appearing in the area.

Further, to ensure that marking 448a conforms to a hatching pattern, the marking is approximated with a set of line segments 467. The approximation can be done by using known methods of feature segments extraction or vectorization of graphics. Assuming that a sufficiently good approximation is possible, commonly known mathematical algorithms are used to verify that segments 467 are substantially parallel and that distribution of distances between segments 467 is sufficiently narrow. Strong conformity of marking 448a as seen in expanded view 465 to a set of near-parallel near-periodic segments 467 shows high confidence, meaning that the marking conforms well to a hatching pattern. For simplicity, a Boolean value of 1 can be used to characterize this confidence. One way to calculate matching score 145 for the response in area 445a is to multiply values of all confidence levels (ranging between 0 and 1) involved in image pattern matching step 140, thus producing matching score value equal 0.95*0.93*1=0.88.

Analogous calculations for the response in area 445a produce confidence values of 0.86 for filling distribution in rectangles inside region 462, of 0.60 for rectangles bordering region 462 and of 1 for conformity to a hatching pattern. In this case, matching score 145 equals 0.86*0.60*1=0.51, clearly reflecting that response 448b is of lower merit than response 448a. Assuming threshold value of 0.75 and a 5-point grading scale, response 448a is above the threshold and earns response value 150 equal 5 points, while response 448b is below the threshold and earns response value 150 equal 0 points.

An additional verification is needed that the region defined by pentagon pattern 458 is the only region in the area bearing respondent marking, whereby a response provided in area 405b would be of less merit than a response provided in area 405a. This verification can be accomplished by checking that other designated regions (triangle and square in question 440) are non-marked. Since question 440 offers several clear choices, analysis of every designated region can be performed separately to reveal responses frequencies of every region for evaluation results 170. Rules for calculating pattern matching confidences, matching score and response values are specified in evaluation template 185.

Referring to FIG. 4C, an evaluation question 480 instructs a respondent to draw a filled object having certain shape and area. A blank area of interest 482 is chosen and marked areas containing pictorial responses 485a and 485b are provided. The analysis is done similarly to the analysis of FIGS. 4A-4B in many ways. With reference to marked area 485a, respondent marking 488a is similarly extracted from the provided marked area 485a. Additionally boundary lines 492 defining shape of marking are determined through a series of steps. First, all separate strokes are identified with common edge detection methods such as Laplace algorithm or Sobel algorithm. Then all found edges are approximated by line or arc segments 492 using feature segments extraction, vectorization, or other algorithms. Finally, outermost lines forming shape boundaries are found with standard methods of plane geometry and statistics, among marking strokes having sufficiently good line approximation. For example, an indicated shape can be uncovered as a triangle with the largest area among all closed triangles formed by lines 492. Plane geometry methods are used to verify that the found boundary lines define a triangle 497 (indicated with empty circles in expanded view 495). In an alternative embodiment, the shape of marking 488a is defined by finding a predefined dictionary pattern whose characteristic features have the highest similarity with extracted characteristic features of the separate strokes identified in marking 488a.

Known algebraic methods are used to calculate the area of formed triangle 497 using scale of plot axis specified in evaluation template 185. In this case, response confidence includes area confidence, or agreement between estimated area of triangle 497 and area requested in the question formulation. Confidence for filling pattern of triangle 497 is determined similarly to steps described with reference to panel 460 of FIG. 4B. Matching score 145 is calculated based on the calculated shape, area and filling confidences, according to the rules specified in evaluation template 185.

In the case of respondent marking in area 485b, which consists of two separate parts, both parts of the marking contain calculated boundary lines. Thus, the boundary lines do not form a triangle within area 485b and response 485b is assigned low matching score 145. Optionally, for certain values of calculated confidences or matching score 145 processing instructions specified in evaluation template 185 can instruct the algorithm to request operator discretion 155. Thereby the response 485b is shown to an operator on display 240 and the operator supplies response value 150 using input device 242. In this case, the operator can adjust processing parameters by changing default area of interest 482 to smaller area 489b.

The result of the processing corresponding to steps 130-150 described with reference to FIGS. 4A-4C is that evaluation responses are assigned response values based on their pictorial representation on response sheets. The exemplary image processing algorithms illustrated in FIGS. 4A-4C are not intended to be limiting, as one of skill in the art can envision other methods that are appropriate to achieve similar goals.

Figure 5:
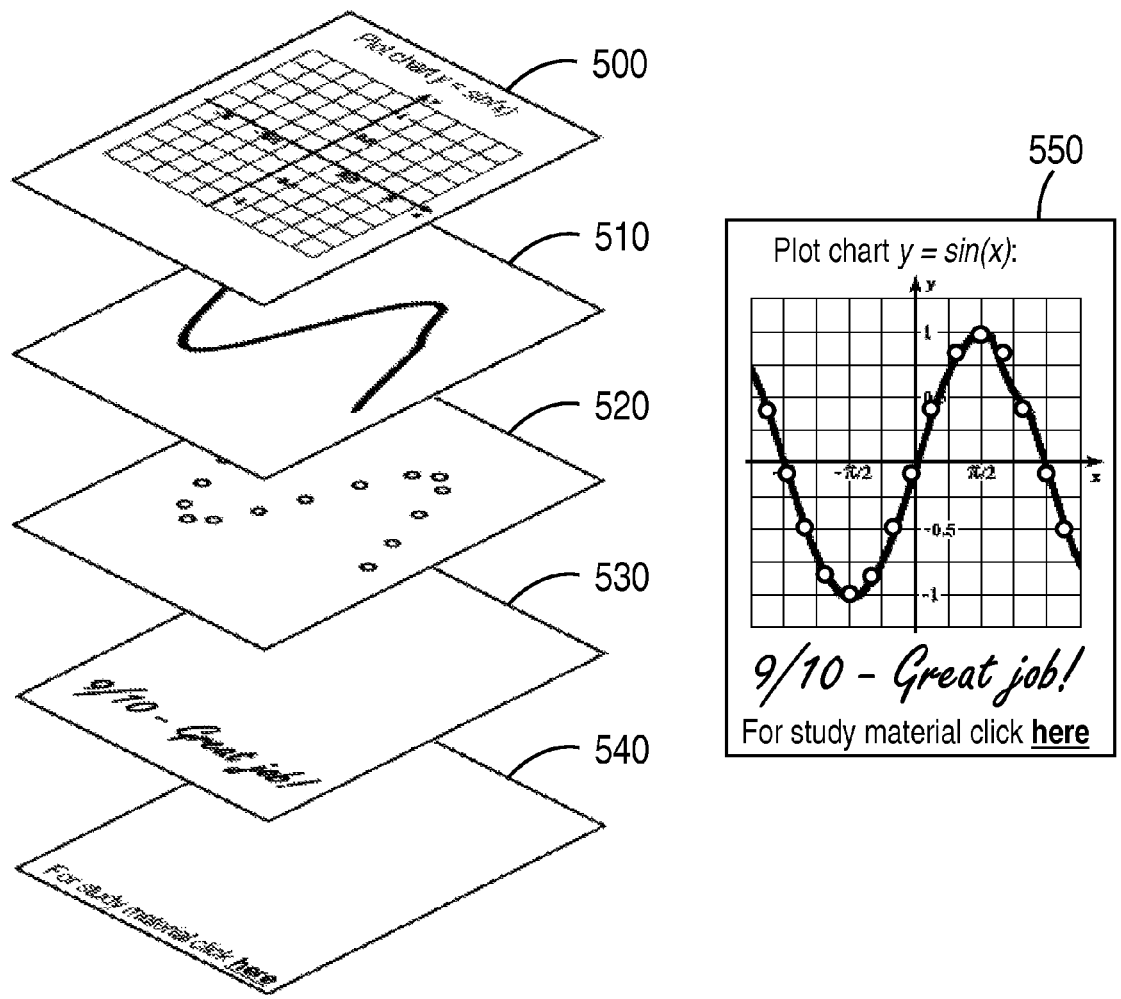
FIG. 5 illustrates composition of an exemplary contextualized response display using an embodiment of the present invention.

Referring now to FIG. 5, an exemplary contextualized response display is shown. In an embodiment, description of respondent marking 408a is recorded during step 130 or step 170 and is subsequently used to produce a response presentation similar to originally submitted data 405a. The presentation shown during step 155 or step 190 is combined from one or more parts, in particular to emphasize each of the parts in a different way. The parts in this example include overlaid images and data structures illustrated as layers 500-540. Particular rules for arranging layers and composing each layer are specified in display template 180.

Layer 500 is an image of a blank area corresponding to the response. Layer 500 serves as a background containing question formulation when displaying the response. Layer 510 is an image of the respondent marking 408a, typically shown in a different color than layer 500. Layer 520 is a representation of the solution to the question, typically shown in a color different than layers 500 and 510. Layer 530 relates to recorded response value 150 and may contain dynamically generated elements specified in display template 180 that are different for different response values. Layer 540 containing relevant information is optionally appended for certain response values, as specified in display template 180. The relevant information includes comments of an evaluation administrator and interactive elements, such as hypertext links, application controls, display controls and other interactive user interface elements.

When combined, layers 500-540 produce result shown in panel 550 that is shown on display 260. In this example, the process of combining layers includes image overlaying for layers 500-520 and appending data structures for layers 530-540. The arrangement and content of layers used for contextualized response display can be affected by factors such as response type, permissions of viewer, purpose of presentation (e.g. notification, discretionary editing or evaluation report), viewing screen resolution, requested type of evaluation context, type of display device, etc., as described in display template 180.

In one embodiment, a discrete approximation with imaginary dot patterns 418 of respondent marking 208*a* is recorded, in order to save storage resources. During the displaying step 190 the respondent marking in part 510 is restored from the approximation. Thus, the contents of layer 520 are generated dynamically in the process of creation of the response presentation. In another embodiment, an image clip containing entire marked area 405*a* is recorded to the evaluation results dataset during step 170 and the recording is subsequently displayed in its original form. In an embodiment, contextualized response display step 155 uses one or more areas chosen differently than the areas used for analyzing the response during steps 130-150. The output of step 190 is an exhibit indicative of the appearance of the originally provided response data in the evaluation. The skilled artisan will understand that other ways and enhancements to accomplish step 190 of contextualized display of a pictorial response may also be used.

The skilled artisan will appreciate that it is desirable to present pictorial responses within their evaluation context for the purposes of accountability, documentation and convenience. Such contextualized response presentation facilitates human control over processing of the evaluation by making comprehension of provided responses easier. Easier comprehension is useful during step 155 of producing the value of the responses by an operator or during review step 190 by an evaluation respondent or an evaluator for validation purposes. In knowledge assessments contextualized response presentation provides respondents with an excellent learning tool by enabling self-study through a meaningful review of the evaluation results, and provides evaluation practitioners with a valuable diagnostic tool by exposing the thought process of the respondent. Inclusion of interactive elements such as in part 540 increases effectiveness of learning by providing access to relevant study material and enabling student-teacher communication, enhances editing of response values by enabling convenient data entry, facilitates quick transfer of the response data into another application, etc. In an embodiment, step 190 is used for delivery of notifications related to evaluation results 170, whereby evaluators or respondents receive electronic messages, either scheduled or in real-time, containing contextualized display of responses assigned certain response values.

Figure 6:
FIG. 6 shows exemplary pictorial responses in form of regions.
Figure 6:
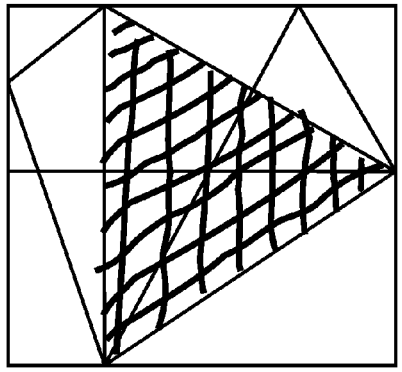
Figure 6:
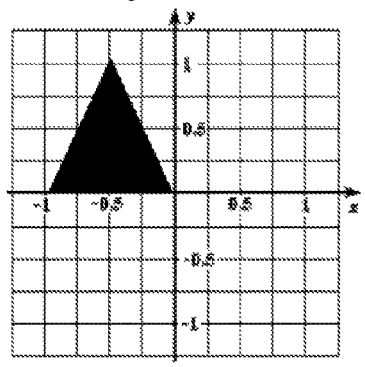
Figure 6:
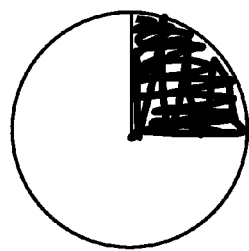

FIG. 6 shows exemplary pictorial responses in form of regions. Region patterns can indicate attributes including but not limited to spatial arrangement (panel 610), shape (panel 620) and magnitude (panels 620-640). The skilled artisan will appreciate that pictorial questions offer a great range of complexity levels by offering the flexibility to present evaluation material in any manner that is desired. As a result, they can greatly mitigate a well-known problem of test score pollution in standardized knowledge assessments. The term "pictorial questions" is used herein to refer to evaluation questions requiring response in a pictorial form. The most commonly used form of questions in standardized knowledge assessments is multiple choice format, whereby a respondent indicates a selection from several clearly indicated pre-compiled answer options. The limited number of answer options typically not exceeding five results in a substantial probability of guessing a correct answer without possessing the necessary knowledge whose presence the question is designed to assess. Clearly, a substantial guessing probability makes performing a reliable knowledge assessment challenging. Pictorial questions can make guessing probability negligible by providing a large number of answer options (panels 610-620). In many cases, pictorial questions can essentially eradicate the problem of test score pollution by eliminating presence of answer options or other indications of a correct answer in question display, thus enabling a broad spectrum of responses (panels 630-640).

In some cases pictorial form of responses to a knowledge assessment question enables revealing the most optimal solution to the question that could be used as the correct solution or to verify a proposed solution. For example, the most optimal solution can be discovered from statistics of a large sample of valid responses to a question asking for the largest or the smallest possible value of a quantity, such as question in panel 620.

Figure 7:
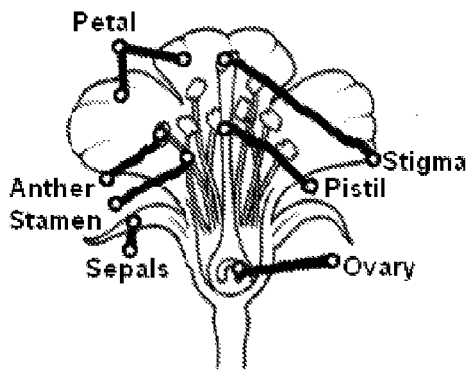
FIG. 7 shows examples of pictorial responses in form of lines.
Figure 7:
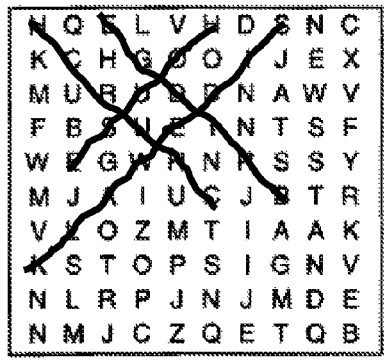
Figure 7:
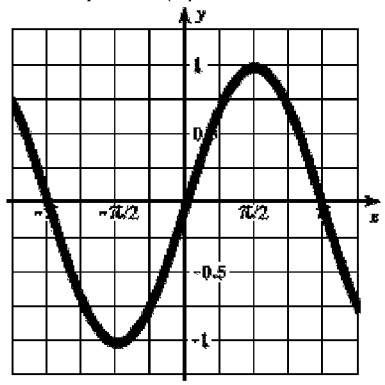
Figure 7:
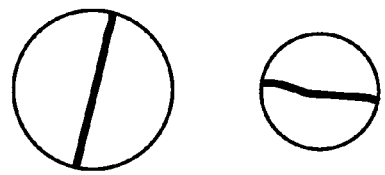
Figure 7:
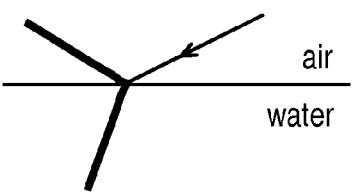

FIG. 7 shows exemplary pictorial responses in form of lines. Line patterns can indicate attributes including but not limited to spatial arrangement (panels 710, 720, 740), shape (panels 730, 760), magnitude (panel 770), angle (panel 780) and correspondence of parts (panel 750). In an embodiment, image patterns associated with a response during step 135 can be defined dynamically during the time of the response processing. A response depicted in area 770 demonstrates two different ways to provide the same response value. One part of the respondent marking is best associated with a line 770*a*, and the other part having irregular shape is best associated with a region 770*b*. Selection of the most suitable image pattern can be conducted among a predefined set of patterns specified in evaluation template 185, following an optional attempt to match the response with a default image pattern. The necessity to use a region for case 770*b* is signaled by low matching confidence generated during matching with a line pattern. In this example, one response score relates to the length of marked line 770*a* divided by the length of the bounding markup box, and another response score relates to the surface area of rectangle marked with filling 770*b* divided by surface area of the bounding markup box.

Figure 3A:
FIG. 3 illustrates exemplary image patterns representing (A) dots; (B) lines; and (C) regions.
Figure 3B:
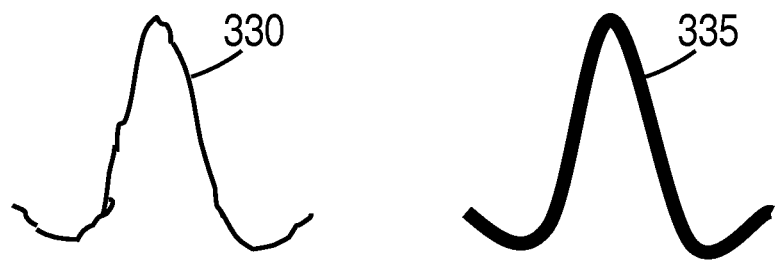
Figure 3C:
Figure 8:
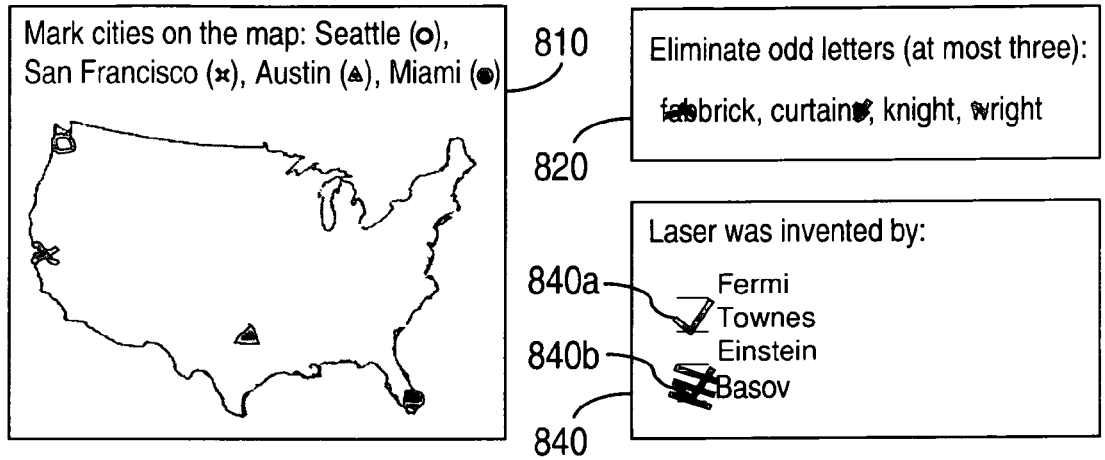
FIG. 8 shows examples of pictorial responses in form of dots.

FIG. 8 shows exemplary pictorial responses in form of dots. Dot patterns can indicate attributes including but not limited to spatial arrangement (panels 810-830) and shape (FIG. 3A). In some questions, such as a question in panel 820, shape of dots (centered at the printed letters locations) is not explicitly linked to the response values. In other questions, such as a question in panel 810, shape of dots directly affects the matching score assigned during step 145 and influences response value 150. In some embodiments, variations across different parts of respondent marking within the same pictorial response affect matching score 145, as specified in processing algorithm stored in memory 202 and/or in evaluation template 185. This allows to improve rate of response recognition as well as to provide a way for a respondent to correct a misguided response. Taking marking in panel 840 as an example, both parts of marking 840*a* and 840*b* associated with a dot pattern could be interpreted as marked dots; alternatively, a large variation between size and density of the two parts of the marking signals an intended response correction, whereby only one dot 840*a* is interpreted as marked.

Since one of the objectives of open-ended response format is to provide a broad range of possible response variations, knowledge assessment questions may involve multiple versions of a correct answer. For example, the question illustrated in panel 820 clearly offers several different ways to fully satisfy the objective stated in question formulation. In such cases, evaluation template can include description of permitted variations of the correct response yielding same or different response values for each of the variations.

Figure 9:
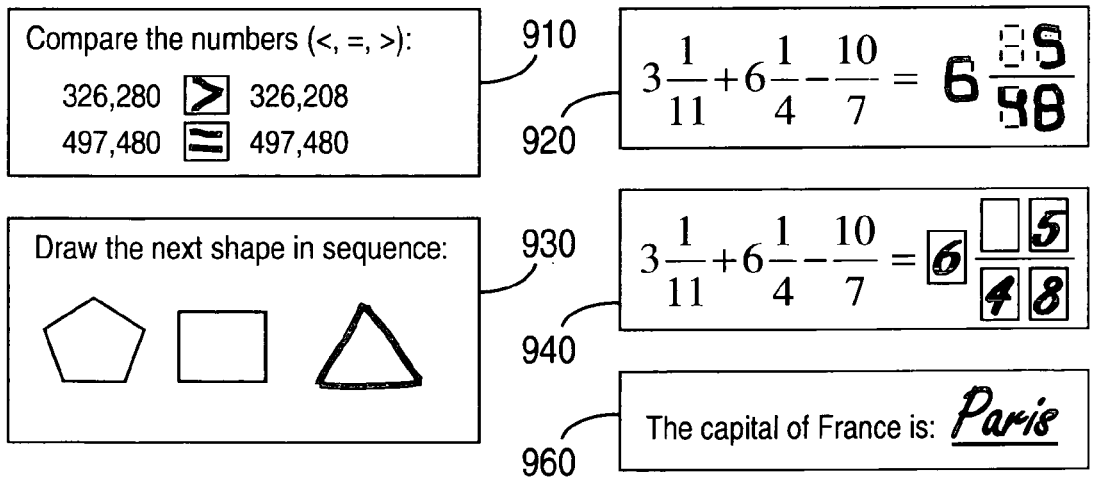
FIG. 9 shows examples of pictorial responses in form of symbols and shapes.

FIG. 9 shows exemplary pictorial responses in form of symbols and shapes. Symbols and shapes patterns can represent geometrical objects (panel 930), scientific, mathematical and technical symbols (panels 910, 920, 940), handwriting (panels 940, 960), freehand drawing (panel 930) and so on. These more complex patterns can be processed either by decomposing into simpler image patterns as indicated previously, by using suitable image processing algorithms known to those skilled in the art, or by utilizing editor discretion from step 155. For example, evaluation results 170 describing exemplary responses 940 and 960 may include results of character recognition obtained by standard character extraction and character recognition techniques. In addition, such processing may involve storing clipped parts of images of evaluation response sheets or other intermediate results in computer-readable media.

Some embodiments utilize evaluation questions with auxiliary markup suggesting a certain format of response (panels 710, 920), while other embodiments allow for few or no suggestions of a desired format of response (panels 750, 760, 940). The format suggestions may be expressed in formulation of the question, both in form of verbal instruction (specific drawing directions in area 640) and auxiliary pictorial markup (circular markers in panel 710 and segment outlines in panel 920). Pictorial responses are either provided in a separate space substantially devoid of any other marking (panels 740, 750) or superimposed onto formulation of the question (panels 710, 720). In an embodiment, the auxiliary marking is designed to vanish during the process of obtaining response data 100-115. For example, segment outlines in panel 920 can be printed in light gray on scannable sheets 100 so that during black-and-white scanning in step 105 the segments, due to their low contrast level, drop out of the scanned images simplifying subsequent process 120. Alternatively, the entire question formulation in panel 710 can be printed using a unique color to make background subtraction during step 135 easier.

The skilled artisan will appreciate that administering pictorial responses adds an important learning component to educational diagnostic evaluations. Tasks instructing to construct a response as opposed to recognizing a correct answer, such as locating an object in its environment (panels 610, 710, 810) or making a drawing of an object (panels 630, 730, 760, 930), train visual memory and help memorize question material. Further, pictorial responses improve respondent experience by making response format feel more natural, intuitive and engaging. Such improvement enables administering evaluations to a broader demographic, for example, by making evaluation questions look more entertaining and friendly (panels 640, 710, 720, 810, 820, 930) to the younger population.

In one embodiment, the processing method can be deployed in an interactive mode providing respondents with instant feedback on their responses. Interactive deployment mode can enrich user experience of interactive whiteboards and touch screens, or give rise to standalone applications, in particular for devices with a touch screen. For example, such deployment mode enables interactive education games involving object identification and composition for touch screen devices, with topics ranging from studying a foreign language to learning geography.

The present invention has a broad range of applications, and the commonly referred to herein term "evaluation" relates to counting votes in elections, grading knowledge assessments, scoring professional and other qualification tests, conducting market and data surveys, collecting feedback, gathering personal data, and the like.

The advantages of the invention are numerous. Different aspects, embodiments or implementations may yield one or more of the following advantages. One advantage of the invention is that pictorial responses offer greater flexibility in presentation of question material thus enhancing the quality of collected data and improving respondent experience. Another advantage is that evaluations containing pictorial responses provide robust tools for reporting results and diagnosing results of knowledge assessments.

The many features and advantages of the described embodiments are apparent from the written description and, thus, it is intended by the appended claims to cover such features and advantages. Further, since numerous modifications and changes will readily occur to those skilled in the art, the invention should not be limited to the exact construction and operation as illustrated and described. Hence, all suitable modifications and equivalents may be resorted to as falling within the scope of the invention.

The invention claimed is:

1. A computerized system for processing of an evaluation containing pictorial responses, comprising:
    a collection terminal configured for obtaining in a digital form evaluation response data provided by a plurality of evaluation respondents; and
    a processing terminal including a non-volatile memory configured for storing an evaluation template for analyzing at least one area of interest containing a pictorial response within the obtained response data, said processing terminal is electronically coupled to the collection terminal, and said evaluation template specifying location of areas of interest, and the evaluation template includes an image pattern including a set of predefined segments, wherein analyzing includes:
    locating the area of interest within the obtained response data;
    determining a type of the response within the area of interest from a set of predefined response types, wherein the set of predefined response types includes a first response type associated with marking patterns within the area of interest, and a second response type associated with a set of lines;
    determining the type of the response within the area of interest is the second response type; and
    determining a value of the response by applying a processing method corresponding to the second type of the response, wherein the value is based on a number of segments from the set of predefined segments that the set of lines within the area of interest overlaps;

whereby different types of responses are consistently processed within the evaluation.

2. The system of claim 1, further comprising a display terminal including an electronic display configured for displaying pictorial response data within an evaluation context using a display template stored in the non-volatile memory of the processing terminal, said display terminal is electronically coupled to the processing terminal.

3. The system of claim 1, wherein said processing method corresponding to the type of the response includes interpretation of the response by a trained editor using an editing terminal, said editing terminal is electronically coupled to the processing terminal.

4. The system of claim 1, wherein said processing method corresponding to the type of the response includes:
associating the response with a set of image patterns specified in the evaluation template;
analyzing a representation of each of the image patterns in the response and associating the value with each representation; and
determining the value of the response based on the values associated with the representations of the image patterns.

5. The system of claim 1, wherein said evaluation includes at least three different types of responses.

6. The system of claim 1, wherein at least one of the collecting terminal and the processing terminal comprise a plurality of geographically distributed computing systems that are capable of transferring the response data using standard data transfer protocols.

7. The system of claim 1, wherein said analyzing is used to update the evaluation template data.

8. A computer-implemented method for processing of pictorial responses in an evaluation, said processing comprising:
using a collection terminal, obtaining in a digital form evaluation response data provided by a plurality of evaluation respondents;
using a computer, identifying a pictorial response within the obtained response data;
using a set of rules specified in an evaluation template;
determining a type of the response from a set of predefined response types, wherein the set of predefined response types includes a first response type associated with marking patterns within the area of interest, and a second response type associated with a set of lines; and
determining a value of the response, said evaluation template including an image pattern including a set of predefined segments, said type of the response within the area of interest including the set of lines, and said value of the response being based on a number of segments from the set of predefined segments that the set of lines within the area of interest overlaps; and
recording the value of the response to a computer-readable media;
whereby different types of responses are processed in a consistent manner.

9. The method of claim 8, further comprising using an electronic display to display the pictorial response within an evaluation context using a display template.

10. The method of claim 8, wherein said determining the value of the response comprises using discretion of a trained editor to interpret the response utilizing an electronic display.

11. The method of claim 8, wherein said determining the value of the response comprises:
associating the response with a set of image patterns specified in the evaluation template;
analyzing a representation of each of the image patterns in the response;
and associating the value with each representation.

12. The method of claim 8, wherein said evaluation includes at least three different types of responses.

13. The method of claim 8, wherein said processing deploys a plurality of geographically distributed computing systems that are capable of transferring the response data using standard data transfer protocols.

14. A computerized system for processing of an evaluation containing pictorial responses, comprising:
a collecting device for obtaining in a digital form evaluation response data provided by a plurality of evaluation respondents, wherein obtaining includes converting the response data to a suitable digital form;
a storing device for storing an evaluation template, said evaluation template specifying location of areas of interest and image patterns associated with pictorial responses; and
an analyzing device for analyzing at least one area of interest containing a pictorial response within the obtained response data using the evaluation template, wherein analyzing includes:
locating the area of interest within the obtained response data;
identifying a pictorial response within the area of interest;
determining a type of the response within the area of interest from a set of predefined response types, wherein the set of predefined response types includes a first response type associated with marking patterns within the area of interest, and a second response type associated with a set of lines;
associating the pictorial response with a type of response, said evaluation template including an image pattern including a set of predefined segments, said pictorial response within the area of interest including the set of lines;
analyzing a representation of each of the image patterns in the response and associate a value with each representation;
determining the value of the response based a number of segments from the set of predefined segments that the set of lines within the area of interest overlaps; and
recording the value of the response to a computer-readable media.

15. The system of claim 14, further comprising a displaying device for displaying the pictorial response within an evaluation context using a display template stored in the storing device, wherein said displaying device include an electronic screen.

16. The system of claim 14, wherein said analyzing device comprise discretion of a trained editor including interpretation of the pictorial response by the trained editor.

17. The system of claim 14, wherein said collection device comprise at least one of a document scanner, an electronic imaging device, an interactive whiteboard, an electronic screen, a touch screen, a drawing pad, a network adapter, a disk controller, and a signal receiver.

18. The system of claim 14, wherein said evaluation includes at least three different types of responses.

19. The system of claim 14, wherein at least one of said collecting device, said storing device, and said analyzing device are geographically distributed.

20. The system of claim 14, wherein said analyzing is used to update the evaluation template data.

* * * * *